US009401986B2

(12) United States Patent
Goswami et al.

(10) Patent No.: US 9,401,986 B2
(45) Date of Patent: *Jul. 26, 2016

(54) UNIQUE GLOBAL IDENTIFIER HEADER FOR MINIMIZING PRANK EMERGENCY 911 CALLS

(71) Applicant: TeleCommunication Systems, Inc., Annapolis, MD (US)

(72) Inventors: Bhavesh Goswami, Seattle, WA (US); Victor Burton, Seattle, WA (US); Gerhard Geldenbott, Seattle, WA (US); Salman Ali, Issaquah, WA (US); Arpita Saha, Redmond, WA (US); Yi-Min Flora Chua, Issaquah, WA (US); Andy Hazzard, Seattle, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/851,480

(22) Filed: Sep. 11, 2015

(65) Prior Publication Data
US 2016/0006869 A1    Jan. 7, 2016

Related U.S. Application Data

(63) Continuation of application No. 14/448,320, filed on Jul. 31, 2014, now Pat. No. 9,178,996, which is a continuation of application No. 13/632,313, filed on Oct. 1, 2012, now Pat. No. 8,831,556.

(60) Provisional application No. 61/541,615, filed on Sep. 30, 2011.

(51) Int. Cl.
*H04M 11/04* (2006.01)
*H04M 3/436* (2006.01)
(Continued)

(52) U.S. Cl.
CPC ............ *H04M 3/436* (2013.01); *H04L 61/308* (2013.01); *H04M 3/5116* (2013.01);
(Continued)

(58) Field of Classification Search
CPC ..... H04M 3/436; H04M 3/2281; H04M 3/38; H04M 4/16; H04M 2242/04
USPC ............... 379/37, 45, 133, 145, 144.03, 154; 455/404.1, 404.2, 410, 414.1, 414.2, 455/422.1, 521
See application file for complete search history.

(56) References Cited

U.S. PATENT DOCUMENTS

| 1,103,073 A | 7/1914 | O'Connell |
| 4,445,118 A | 4/1984 | Taylor et al. |

(Continued)

FOREIGN PATENT DOCUMENTS

| WO | WO99/21380 | 4/1999 |
| WO | WO01/45342 | 6/2001 |

(Continued)

OTHER PUBLICATIONS

Le-Pond Chin, Jyh-Hong Wen, Ting-Way Liu, The Study of the Interconnection of GSM Mobile Communications Systems Over IP Based Network, May 6, 2001, IEEE, Vehicular Technology Conference, vol. 3, pp. 2219-2223.

(Continued)

*Primary Examiner* — Binh Tieu
(74) *Attorney, Agent, or Firm* — Tarolli, Sundheim, Covell & Tummino LLP (57) ABSTRACT

A prank call server that performs 911 prank call filtering over a 911 emergency call system, prior to routing a 911 call to a PSAP. The inventive prank call server identifies prank calling devices, regardless of current service subscription, by retrieving and analyzing emergency call data pertaining to detected prank 911 calls. The prank call server assigns a unique global identifier to each 911 call detected on the 911 emergency call system. Unique global identifiers enable a PSAP to uniquely identify prank 911 calls that are identified thereon. A PSAP transmits a prank call signal and a relevant unique global identifier to the prank call server, for each prank 911 call that is detected. A prank call signal/unique global identifier combination triggers the prank call server to store all available call data for a referenced prank 911 call in to a prank call database, for subsequent prank call filtering analysis.

20 Claims, 6 Drawing Sheets

(51) Int. Cl.
*H04M 3/51* (2006.01)
*H04L 29/12* (2006.01)
*H04W 4/02* (2009.01)
*H04W 4/22* (2009.01)

(52) U.S. Cl.
CPC .............. *H04W 4/028* (2013.01); *H04W 4/22* (2013.01); *H04M 2203/6027* (2013.01); *H04M 2203/6081* (2013.01)

(56) References Cited

U.S. PATENT DOCUMENTS

| | | | |
|---|---|---|---|
| 4,494,119 A | 1/1985 | Wimbush |
| 4,651,156 A | 3/1987 | Martinez |
| 4,706,275 A | 11/1987 | Kamil |
| 4,737,916 A | 4/1988 | Ogawa |
| 4,891,638 A | 1/1990 | Davis |
| 4,891,650 A | 1/1990 | Sheffer |
| 4,939,662 A | 7/1990 | Numura |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Scheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,389,934 A | 2/1995 | Kass |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,557,254 A | 9/1996 | Johnson |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,122 A | 6/1997 | Shah |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,684,951 A | 11/1997 | Goldman |
| 5,689,245 A | 11/1997 | Noreen |
| 5,689,269 A | 11/1997 | Norris |
| 5,689,809 A | 11/1997 | Grube |
| 5,699,053 A | 12/1997 | Jonsson |
| 5,727,057 A | 3/1998 | Emery |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,774,824 A | 6/1998 | Streit |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,801,700 A | 9/1998 | Ferguson |
| 5,802,492 A | 9/1998 | DeLorrme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khuc |
| 5,841,396 A | 11/1998 | Krasner |

(56) References Cited

U.S. PATENT DOCUMENTS

| | | |
|---|---|---|
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard |
| 5,926,118 A | 7/1999 | Hayashida |
| 5,930,250 A | 7/1999 | Klok |
| 5,944,768 A | 8/1999 | Ito |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,982,301 A | 11/1999 | Ohta |
| 5,983,099 A | 11/1999 | Yao |
| 5,983,109 A | 11/1999 | Montoya |
| 5,987,323 A | 11/1999 | Huotari |
| 5,998,111 A | 12/1999 | Abe |
| 5,999,124 A | 12/1999 | Sheynblat |
| 6,002,936 A | 12/1999 | Roel-Ng |
| 6,014,602 A | 1/2000 | Kithil |
| 6,032,051 A | 2/2000 | Hall |
| 6,035,025 A | 3/2000 | Hanson |
| 6,035,253 A | 3/2000 | Hayashi |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,091,957 A | 7/2000 | Larkins |
| 6,101,378 A | 8/2000 | Barabash |
| 6,108,533 A | 8/2000 | Brohoff |
| 6,115,611 A | 9/2000 | Kimoto |
| 6,122,503 A | 9/2000 | Daly |
| 6,122,520 A | 9/2000 | Want |
| 6,124,810 A | 9/2000 | Segal |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos |
| 6,138,003 A | 10/2000 | Kingdon |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,516 B1 | 1/2001 | Watanabe |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schnieder |
| 6,178,506 B1 | 1/2001 | Quick, Jr. |
| 6,181,935 B1 | 1/2001 | Gossman |
| 6,181,939 B1 | 1/2001 | Ahvenainen |
| 6,182,006 B1 | 1/2001 | Meek |
| 6,182,227 B1 | 1/2001 | Blair |
| 6,185,426 B1 | 2/2001 | Alperovich |
| 6,188,354 B1 | 2/2001 | Soliman |
| 6,188,752 B1 | 2/2001 | Lesley |
| 6,188,909 B1 | 2/2001 | Alanara |
| 6,188,957 B1 | 2/2001 | Bechtolsheim |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,204,844 B1 | 3/2001 | Fumarolo |
| 6,205,330 B1 | 3/2001 | Winbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feaugue |
| 6,249,680 B1 | 6/2001 | Wax |
| 6,249,742 B1 | 6/2001 | Friederich |
| 6,249,744 B1 | 6/2001 | Morita |
| 6,249,873 B1 | 6/2001 | Richard |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,278,936 B1 | 8/2001 | Jones |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,317,684 B1 | 11/2001 | Roeseler |
| 6,321,091 B1 | 11/2001 | Holland |
| 6,321,092 B1 | 11/2001 | Fitch |
| 6,321,158 B1 | 11/2001 | DeLorme |
| 6,321,257 B1 | 11/2001 | Kotala |
| 6,324,542 B1 | 11/2001 | Wright, Jr. et al. |
| 6,327,473 B1 | 12/2001 | Soliman |
| 6,327,479 B1 | 12/2001 | Mikkola |
| 6,331,825 B1 | 12/2001 | Ladner |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,366,782 B1 | 4/2002 | Fumarolo |
| 6,366,856 B1 | 4/2002 | Johnson |
| 6,367,019 B1 | 4/2002 | Ansell |
| 6,370,389 B1 | 4/2002 | Isomursu |
| 6,377,209 B1 | 4/2002 | Krasner |
| 6,397,143 B1 | 5/2002 | Peschke |
| 6,400,314 B1 | 6/2002 | Krasner |
| 6,400,943 B1 | 6/2002 | Montoya |
| 6,400,958 B1 | 6/2002 | Isomursu |
| 6,411,254 B1 | 6/2002 | Moeglein |
| 6,415,224 B1 | 7/2002 | Wako |
| 6,421,002 B2 | 7/2002 | Krasner |
| 6,427,001 B1 | 7/2002 | Contractor |
| 6,429,808 B1 | 8/2002 | King |
| 6,433,734 B1 | 8/2002 | Krasner |
| 6,434,381 B1 | 8/2002 | Moore |
| 6,441,752 B1 | 8/2002 | Fomukong |
| 6,442,384 B1 | 8/2002 | Shah |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,466,788 B1 | 10/2002 | Carlsson |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,722 B1 | 3/2003 | Heinrich |
| 6,529,829 B2 | 3/2003 | Turetzky |

(56) References Cited

U.S. PATENT DOCUMENTS

| | | |
|---|---|---|
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,522 B1 | 4/2003 | Flynn |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | fomukong |
| 6,560,534 B2 | 5/2003 | Abraham |
| 6,563,824 B1 | 5/2003 | Bhatia |
| 6,564,261 B1 | 5/2003 | Gudjonsson |
| 6,570,530 B2 | 5/2003 | Gaal |
| 6,571,095 B1 | 5/2003 | Koodli |
| 6,571,174 B2 | 5/2003 | Rigazio |
| 6,574,558 B2 | 6/2003 | Kohli |
| 6,580,390 B1 | 6/2003 | Hay |
| 6,584,552 B1 | 6/2003 | Nishimura |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,423 B1 | 9/2003 | Cooper |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,640,185 B2 | 10/2003 | Yokota et al. |
| 6,643,516 B1 | 11/2003 | Stewart |
| 6,650,288 B1 | 11/2003 | Pitt |
| 6,661,353 B1 | 12/2003 | Gopen |
| 6,661,372 B1 | 12/2003 | Girerd |
| 6,665,540 B2 | 12/2003 | Rantalainen et al. |
| 6,665,541 B1 | 12/2003 | Krasner |
| 6,665,613 B2 | 12/2003 | Duvall |
| 6,665,715 B1 | 12/2003 | Houri |
| 6,671,620 B1 | 12/2003 | Garin |
| 6,677,894 B2 | 1/2004 | Sheynblat |
| 6,680,694 B1 | 1/2004 | Knockeart |
| 6,687,504 B1 | 2/2004 | Raith |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,652 B1 | 4/2004 | Sanqunetti |
| 6,721,716 B1 | 4/2004 | Gross |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,266 B1 | 6/2004 | Hundscheidt |
| 6,757,544 B2 | 6/2004 | Rangarajan |
| 6,757,545 B2 | 6/2004 | Nowak |
| 6,766,174 B1 | 7/2004 | Kenyon |
| 6,771,639 B1 | 8/2004 | Holden |
| 6,771,742 B2 | 8/2004 | McCalmont |
| 6,772,340 B1 | 8/2004 | Peinado |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McCraw |
| 6,799,049 B1 | 9/2004 | Zellner |
| 6,799,050 B1 | 9/2004 | Krasner |
| 6,801,159 B2 | 10/2004 | Swope |
| 6,801,850 B1 | 10/2004 | Wolfson |
| 6,804,524 B1 | 10/2004 | Vandermeijden |
| 6,807,534 B1 | 10/2004 | Erickson |
| 6,810,323 B1 | 10/2004 | Bullock |
| 6,810,405 B1 | 10/2004 | LaRue |
| 6,813,264 B2 | 11/2004 | Vassilovski |
| 6,813,501 B2 | 11/2004 | Kinnunen |
| 6,813,560 B2 | 11/2004 | Van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,816,782 B1 | 11/2004 | Walters |
| 6,819,919 B1 | 11/2004 | Tanaka |
| 6,820,269 B2 | 11/2004 | Baucke et al. |
| 6,829,475 B1 | 12/2004 | Lee |
| 6,829,532 B2 | 12/2004 | Obradovich |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,839,630 B2 | 1/2005 | Sakamoto |
| 6,842,696 B2 | 1/2005 | Silvester |
| 6,842,715 B1 | 1/2005 | Gaal |
| 6,845,321 B1 | 1/2005 | Kerns |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,882,850 B2 | 4/2005 | McConnell et al. |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,895,329 B1 | 5/2005 | Wolfson |
| 6,898,516 B2 | 5/2005 | Pechatnikov |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,910,818 B2 | 6/2005 | McLoone |
| 6,912,230 B1 | 6/2005 | Salkini |
| 6,912,395 B2 | 6/2005 | Benes |
| 6,912,545 B1 | 6/2005 | Lundy |

(56) References Cited

U.S. PATENT DOCUMENTS

| | | |
|---|---|---|
| 6,915,208 B2 | 7/2005 | Garin |
| 6,917,331 B2 | 7/2005 | Gronemeyer |
| 6,925,603 B1 | 8/2005 | Naito |
| 6,930,634 B2 | 8/2005 | Peng |
| 6,934,705 B2 | 8/2005 | Tu |
| 6,937,187 B2 | 8/2005 | Van Diggelen |
| 6,937,872 B2 | 8/2005 | Krasner |
| 6,940,950 B2 | 9/2005 | Dickinson et al. |
| 6,941,144 B2 | 9/2005 | Stein |
| 6,944,535 B2 | 9/2005 | Iwata |
| 6,944,540 B2 | 9/2005 | King |
| 6,947,772 B2 | 9/2005 | Minear |
| 6,950,058 B1 | 9/2005 | Davis |
| 6,957,068 B2 | 10/2005 | Hutchison |
| 6,957,073 B2 | 10/2005 | Bye |
| 6,961,562 B2 | 11/2005 | Ross |
| 6,963,557 B2 | 11/2005 | Knox |
| 6,963,748 B2 | 11/2005 | Chithambaram |
| 6,965,754 B2 | 11/2005 | King |
| 6,965,767 B2 | 11/2005 | Maggenti |
| 6,968,044 B2 | 11/2005 | Beason |
| 6,970,871 B1 | 11/2005 | Rayburn |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,985,747 B2 | 1/2006 | Chithambaram |
| 6,990,081 B2 | 1/2006 | Schaefer |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,058,506 B2 | 6/2006 | Kawase |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,089,110 B2 | 8/2006 | Pechatnikov |
| 7,092,385 B2 | 8/2006 | Gallant |
| 7,103,018 B1 | 9/2006 | Hansen |
| 7,103,574 B1 | 9/2006 | Peinado |
| 7,106,717 B2 | 9/2006 | Rousseau |
| 7,110,773 B1 | 9/2006 | Wallace |
| 7,136,466 B1 | 11/2006 | Gao |
| 7,136,838 B1 | 11/2006 | Peinado |
| 7,142,163 B2 | 11/2006 | Fukano |
| 7,142,196 B1 | 11/2006 | Connor |
| 7,142,205 B2 | 11/2006 | Chithambaram |
| 7,145,900 B2 | 12/2006 | Nix |
| 7,151,946 B2 | 12/2006 | Maggenti |
| 7,167,187 B2 | 1/2007 | Scott |
| 7,171,220 B2 | 1/2007 | Belcea |
| 7,171,304 B2 | 1/2007 | Wako |
| 7,177,397 B2 | 2/2007 | McCalmont |
| 7,177,398 B2 | 2/2007 | Meer |
| 7,177,399 B2 | 2/2007 | Dawson |
| 7,184,418 B1 | 2/2007 | Baba |
| 7,200,380 B2 | 4/2007 | Havlark |
| 7,202,801 B2 | 4/2007 | Chou |
| 7,209,758 B1 | 4/2007 | Moll |
| 7,209,969 B2 | 4/2007 | Lahti |
| 7,218,940 B2 | 5/2007 | Niemenna |
| 7,221,959 B2 | 5/2007 | Lindquist |
| 7,245,900 B1 | 7/2007 | Lamb |
| 7,245,910 B2 | 7/2007 | Osmo |
| 7,260,186 B2 | 8/2007 | Zhu |
| 7,260,384 B2 | 8/2007 | Bales |
| 7,266,376 B2 | 9/2007 | Nakagawa |
| 7,286,929 B2 | 10/2007 | Staton |
| 7,330,899 B2 | 2/2008 | Wong |
| 7,333,480 B1 | 2/2008 | Clarke |
| 7,340,241 B2 | 3/2008 | Rhodes |
| 7,369,508 B2 | 5/2008 | Parantainen |
| 7,369,530 B2 | 5/2008 | Keagy |
| 7,424,293 B2 | 9/2008 | Zhu |
| 7,426,380 B2 | 9/2008 | Hines |
| 7,428,571 B2 | 9/2008 | Ichimura |
| 7,436,785 B1 | 10/2008 | McMullen |
| 7,440,442 B2 | 10/2008 | Grabelsky |
| 7,450,951 B2 | 11/2008 | Vimpari |
| 7,453,990 B2 | 11/2008 | Welenson |
| 7,477,903 B2 | 1/2009 | Wilcock |
| 7,495,608 B1 | 2/2009 | Chen |
| 7,522,581 B2 | 4/2009 | Acharya |
| 7,565,157 B1 | 7/2009 | Ortega |
| 7,602,886 B1 | 10/2009 | Beech |
| 7,623,447 B1 | 11/2009 | Faccin |
| 7,627,331 B2 | 12/2009 | Winterbottom |
| 7,653,544 B2 | 1/2010 | Bradley |
| 7,660,321 B2 | 2/2010 | Cortes |
| 7,702,081 B1 | 4/2010 | Klesper |
| 7,711,094 B1 | 5/2010 | Olshansky |
| 7,739,033 B2 | 6/2010 | Murata |
| 7,747,258 B2 | 6/2010 | Farmer |
| 7,751,614 B2 | 7/2010 | Funakura |
| 7,774,003 B1 | 8/2010 | Ortega |
| 7,783,297 B2 | 8/2010 | Ishii |
| 7,822,823 B2 | 10/2010 | Jhanji |
| 7,881,233 B2 | 2/2011 | Bieselin |
| 7,881,730 B2 | 2/2011 | Sheha |
| 7,895,263 B1 | 2/2011 | Kirchmeier |
| 7,937,067 B2 | 5/2011 | Maier |
| 2001/0011247 A1 | 8/2001 | O'Flaherty |
| 2001/0015756 A1 | 8/2001 | Wilcock |
| 2001/0016849 A1 | 8/2001 | Squibbs |
| 2002/0032036 A1 | 3/2002 | Nakajima |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069239 A1 | 6/2002 | Katada |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086683 A1 | 7/2002 | Kohar |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0123354 A1 | 9/2002 | Nowak |
| 2002/0126656 A1 | 9/2002 | Park |
| 2002/0130906 A1 | 9/2002 | Miyaki |
| 2002/0158777 A1 | 10/2002 | Flick |
| 2002/0164998 A1 | 11/2002 | Younis |
| 2002/0169539 A1 | 11/2002 | Menard |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0014487 A1 | 1/2003 | Iwakawa |
| 2003/0016804 A1 | 1/2003 | Sheha |
| 2003/0026245 A1 | 2/2003 | Ejzak |
| 2003/0032448 A1 | 2/2003 | Bulthuis |
| 2003/0036848 A1 | 2/2003 | Sheha |
| 2003/0036949 A1 | 2/2003 | Kaddeche |
| 2003/0037163 A1 | 2/2003 | Kitada |
| 2003/0040272 A1 | 2/2003 | Lelievre |
| 2003/0045327 A1 | 3/2003 | Kobayashi |
| 2003/0054835 A1 | 3/2003 | Gutowski |
| 2003/0060938 A1 | 3/2003 | Duvall |
| 2003/0065788 A1 | 4/2003 | Salomaki |
| 2003/0072318 A1 | 4/2003 | Lam |
| 2003/0078054 A1 | 4/2003 | Okuda |
| 2003/0078064 A1 | 4/2003 | Chan |
| 2003/0081557 A1 | 5/2003 | Mettala |

(56) References Cited

U.S. PATENT DOCUMENTS

| | | |
|---|---|---|
| 2003/0096623 A1 | 5/2003 | Kim |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0114157 A1 | 6/2003 | Spitz |
| 2003/0119521 A1 | 6/2003 | Tipnis |
| 2003/0119528 A1 | 6/2003 | Pew |
| 2003/0125064 A1 | 7/2003 | Koskinen |
| 2003/0126250 A1 | 7/2003 | Jhanji |
| 2003/0137961 A1 | 7/2003 | Tsirtsis |
| 2003/0149526 A1 | 8/2003 | Zhou |
| 2003/0151501 A1 | 8/2003 | Teckchandani |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0165254 A1 | 9/2003 | Chen |
| 2003/0182053 A1 | 9/2003 | Swope |
| 2003/0186709 A1 | 10/2003 | Rhodes |
| 2003/0196105 A1 | 10/2003 | Fineburg |
| 2003/0201931 A1 | 10/2003 | Durst |
| 2003/0204640 A1 | 10/2003 | Sahineja |
| 2003/0223381 A1 | 12/2003 | Schroderus |
| 2003/0231190 A1 | 12/2003 | Jawerth |
| 2003/0236618 A1 | 12/2003 | Kamikawa |
| 2004/0002326 A1 | 1/2004 | Maher |
| 2004/0002814 A1 | 1/2004 | Gogic |
| 2004/0008225 A1 | 1/2004 | Campbell |
| 2004/0021567 A1 | 2/2004 | Dunn |
| 2004/0032485 A1 | 2/2004 | Stephens |
| 2004/0041729 A1 | 3/2004 | Rowitch |
| 2004/0043775 A1 | 3/2004 | Kennedy |
| 2004/0044623 A1 | 3/2004 | Wake |
| 2004/0047342 A1 | 3/2004 | Gavish |
| 2004/0047461 A1 | 3/2004 | Weisman et al. |
| 2004/0054428 A1 | 3/2004 | Sheha |
| 2004/0068724 A1 | 4/2004 | Gardner |
| 2004/0076277 A1 | 4/2004 | Kuusinen |
| 2004/0098497 A1 | 5/2004 | Banet |
| 2004/0124977 A1 | 7/2004 | Biffar |
| 2004/0132465 A1 | 7/2004 | Mattila |
| 2004/0146040 A1 | 7/2004 | Phan-Anh |
| 2004/0181689 A1 | 9/2004 | Kiyoto |
| 2004/0184584 A1 | 9/2004 | McCalmont |
| 2004/0186880 A1 | 9/2004 | Yamamoto |
| 2004/0190497 A1 | 9/2004 | Knox |
| 2004/0198332 A1 | 10/2004 | Lundsgaard |
| 2004/0198375 A1 | 10/2004 | Schwengler |
| 2004/0198386 A1 | 10/2004 | Dupray |
| 2004/0204829 A1 | 10/2004 | Endo |
| 2004/0204847 A1 | 10/2004 | Yanai |
| 2004/0205151 A1 | 10/2004 | Sprigg |
| 2004/0205517 A1 | 10/2004 | Lampert |
| 2004/0220957 A1 | 11/2004 | McDonough |
| 2004/0229632 A1 | 11/2004 | Flynn |
| 2004/0242238 A1 | 12/2004 | Wang |
| 2004/0267445 A1 | 12/2004 | De Luca |
| 2005/0027445 A1 | 2/2005 | McDonough |
| 2005/0028034 A1 | 2/2005 | Gantman |
| 2005/0031095 A1 | 2/2005 | Pietrowicz |
| 2005/0039178 A1 | 2/2005 | Marolia |
| 2005/0041578 A1 | 2/2005 | Huotari |
| 2005/0043037 A1 | 2/2005 | Ioppe |
| 2005/0043038 A1 | 2/2005 | Maanoja |
| 2005/0053209 A1 | 3/2005 | D'Evelyn |
| 2005/0062636 A1 | 3/2005 | Conway |
| 2005/0063519 A1 | 3/2005 | James |
| 2005/0071671 A1 | 3/2005 | Karaoguz |
| 2005/0078612 A1 | 4/2005 | Lang |
| 2005/0083911 A1 | 4/2005 | Grabelsky |
| 2005/0085999 A1 | 4/2005 | Onishi |
| 2005/0086467 A1 | 4/2005 | Asokan |
| 2005/0090236 A1 | 4/2005 | Schwinke |
| 2005/0101335 A1 | 5/2005 | Kelly |
| 2005/0107673 A1 | 5/2005 | Ball |
| 2005/0112030 A1 | 5/2005 | Gaus |
| 2005/0119012 A1 | 6/2005 | Merheb |
| 2005/0125148 A1 | 6/2005 | Van Buer |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0149430 A1 | 7/2005 | Williams |
| 2005/0159883 A1 | 7/2005 | Humphries |
| 2005/0174991 A1 | 8/2005 | Keagy |
| 2005/0190746 A1 | 9/2005 | Xiong |
| 2005/0190892 A1 | 9/2005 | Dawson |
| 2005/0192822 A1 | 9/2005 | Hartenstein |
| 2005/0201528 A1 | 9/2005 | Meer |
| 2005/0201529 A1 | 9/2005 | Nelson |
| 2005/0209995 A1 | 9/2005 | Aksu |
| 2005/0213716 A1 | 9/2005 | Zhu |
| 2005/0219067 A1 | 10/2005 | Chung |
| 2005/0232252 A1 | 10/2005 | Hoover |
| 2005/0239458 A1 | 10/2005 | Hurtta |
| 2005/0242168 A1 | 11/2005 | Tesavis |
| 2005/0255857 A1 | 11/2005 | Kim |
| 2005/0259675 A1 | 11/2005 | Tuohino |
| 2005/0261002 A1 | 11/2005 | Cheng |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0019724 A1 | 1/2006 | Bahl |
| 2006/0023747 A1 | 2/2006 | Koren et al. |
| 2006/0026288 A1 | 2/2006 | Acharya |
| 2006/0041375 A1 | 2/2006 | Witmer |
| 2006/0053225 A1 | 3/2006 | Poikselka |
| 2006/0058102 A1 | 3/2006 | Nguyen et al. |
| 2006/0068753 A1 | 3/2006 | Karpen |
| 2006/0069503 A1 | 3/2006 | Suomela |
| 2006/0072729 A1 | 4/2006 | Lee et al. |
| 2006/0074547 A1 | 4/2006 | Kaufman |
| 2006/0077911 A1 | 4/2006 | Shaffer |
| 2006/0088152 A1 | 4/2006 | Green |
| 2006/0104306 A1 | 5/2006 | Adamczyk |
| 2006/0120517 A1 | 6/2006 | Moon |
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0200359 A1 | 9/2006 | Khan |
| 2006/0212558 A1 | 9/2006 | Sahinoja |
| 2006/0212562 A1 | 9/2006 | Kushwaha |
| 2006/0224752 A1 | 10/2006 | Parekh |
| 2006/0233338 A1 | 10/2006 | Venkata |
| 2006/0234639 A1 | 10/2006 | Kushwaha |
| 2006/0234698 A1 | 10/2006 | Fok |
| 2006/0239205 A1 | 10/2006 | Warren |
| 2006/0250987 A1 | 11/2006 | White |
| 2006/0258380 A1 | 11/2006 | Liebowitz |
| 2006/0259365 A1 | 11/2006 | Agarwal et al. |
| 2006/0268120 A1 | 11/2006 | Funakura |
| 2006/0270421 A1 | 11/2006 | Phillips |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0004461 A1 | 1/2007 | Bathina |
| 2007/0014282 A1 | 1/2007 | Mitchell |
| 2007/0019614 A1 | 1/2007 | Hoffmann |
| 2007/0021908 A1 | 1/2007 | Jaugilas |
| 2007/0022011 A1 | 1/2007 | Altberg et al. |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0032244 A1 | 2/2007 | Counts |
| 2007/0036139 A1 | 2/2007 | Patel |
| 2007/0049288 A1 | 3/2007 | Lamprecht |
| 2007/0054676 A1 | 3/2007 | Duan |

(56) References Cited

U.S. PATENT DOCUMENTS

| | | |
|---|---|---|
| 2007/0060097 A1 | 3/2007 | Edge |
| 2007/0072553 A1 | 3/2007 | Barbera |
| 2007/0081635 A1 | 4/2007 | Croak |
| 2007/0083911 A1 | 4/2007 | Madden |
| 2007/0115941 A1 | 5/2007 | Patel |
| 2007/0121601 A1 | 5/2007 | Kikinis |
| 2007/0139411 A1 | 6/2007 | Jawerth |
| 2007/0149166 A1 | 6/2007 | Turcotte |
| 2007/0149213 A1 | 6/2007 | Lamba |
| 2007/0162228 A1 | 7/2007 | Mitchell |
| 2007/0182631 A1 | 8/2007 | Berlinsky |
| 2007/0201623 A1 | 8/2007 | Hines |
| 2007/0206568 A1 | 9/2007 | Silver |
| 2007/0206613 A1 | 9/2007 | Silver |
| 2007/0208687 A1 | 9/2007 | O'Connor |
| 2007/0242660 A1 | 10/2007 | Xu |
| 2007/0253429 A1 | 11/2007 | James |
| 2007/0254625 A1 | 11/2007 | Edge |
| 2007/0263610 A1 | 11/2007 | Mitchell |
| 2007/0270164 A1 | 11/2007 | Maier |
| 2007/0291733 A1 | 12/2007 | Doran |
| 2008/0032703 A1 | 2/2008 | Krumm |
| 2008/0037715 A1 | 2/2008 | Prozeniuk |
| 2008/0045250 A1 | 2/2008 | Hwang |
| 2008/0063153 A1 | 3/2008 | Krivorot |
| 2008/0065775 A1 | 3/2008 | Polk |
| 2008/0077324 A1 | 3/2008 | Hatano |
| 2008/0117859 A1 | 5/2008 | Shahidi |
| 2008/0129475 A1 | 6/2008 | Breed |
| 2008/0162637 A1 | 7/2008 | Adamczyk |
| 2008/0176582 A1 | 7/2008 | Ghai |
| 2008/0186164 A1 | 8/2008 | Emigh |
| 2008/0195314 A1 | 8/2008 | Green |
| 2008/0200182 A1 | 8/2008 | Shim |
| 2008/0214202 A1 | 9/2008 | Toomey |
| 2008/0220747 A1 | 9/2008 | Ashkenazi |
| 2008/0288166 A1 | 11/2008 | Onishi |
| 2009/0003535 A1 | 1/2009 | Grabelsky |
| 2009/0067417 A1 | 3/2009 | Kalavade |
| 2009/0097450 A1 | 4/2009 | Wallis |
| 2009/0113346 A1 | 4/2009 | Wickramasuriya |
| 2009/0128404 A1 | 5/2009 | Martino |
| 2009/0177557 A1 | 7/2009 | Klein |
| 2009/0224931 A1 | 9/2009 | Dietz |
| 2009/0298488 A1 | 12/2009 | Snapp |
| 2009/0328163 A1 | 12/2009 | Preece |
| 2010/0003976 A1 | 1/2010 | Zhu |
| 2010/0004993 A1 | 1/2010 | Troy |
| 2010/0042592 A1 | 2/2010 | Stolz |
| 2010/0067444 A1 | 3/2010 | Faccin |
| 2010/0069034 A1* | 3/2010 | Dickinson ........... H04M 3/2281 455/404.1 |
| 2010/0167760 A1 | 7/2010 | Kim |
| 2010/0172482 A1* | 7/2010 | Fotta ..................... H04M 3/436 379/207.02 |
| 2010/0188992 A1 | 7/2010 | Raleigh |
| 2010/0268848 A1 | 10/2010 | Maurya |
| 2011/0113060 A1 | 5/2011 | Martini |
| 2011/0165861 A1 | 7/2011 | Wilson et al. |

FOREIGN PATENT DOCUMENTS

| | | |
|---|---|---|
| WO | WO02/11407 | 2/2002 |
| WO | WO2004/025941 | 3/2004 |
| WO | WO2007/027166 | 6/2005 |
| WO | WO 2005051033 | 6/2005 |

OTHER PUBLICATIONS

Qualcomm CDMA Technologies, LBS Control Plane Roaming—80-VD377-1NP A, 2006, pp. 1-10.

Qualcomm CDMA Technologies, MS Resident User Plane LBS Roaming—80-VC718-1 E, 2006, pp. 1-37.

$3^{rd}$ Generation Partnership Project 2, Position Determination Service Standard for Dual Mode Spread Spectrum Systems, Feb. 16, 2001, pp. i-X, 1-1—1-5, 2-1—2-2, 3-1—3-51, 4-1—4-66, A-1—A2, B-1—B-2, C-1—C-2, D-1—D-2.

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

Extended European Search Report from EPO in European Appl. No. 06827172.5 dated Dec. 29, 2009.

Qualcomm CDMA Technologies, LBS Control Plane/User Plane Overview—80-VD378-1NP B, 2006, pp. 1-36.

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

Mike McMullen, Sprint, LBS Roaming Summit, Sep. 19, 2006.

Nars Haran, U.S. Cellular, Packet Data—Roaming and LBS Overview, Nov. 2, 2007, pp. 1-15.

Location Based Services V2 Roaming Support (non proprietary), 80-V8470-2NP A, dated Jan. 27, 2005, pp. 1-56.

Yilin Ahao, Efficient and reliable date transmission for cellular and GPS based mayday systems, Nov. 1997, IEEE, IEEE Conference on Intelligent Transportation System, 1997. ITSC 97, 555-559.

Examiner's Office Letterin Japanese Patent Application No. 2006-542691 dated Sep. 7, 2009.

JP Laid-Open Gazette No. 2004-158947 (English abstract only).

JP Laid-Open Gazette No. 2007-507123 (counterpart English text US Patent Application Publication No. 2007/0054676).

T. Hattori, "Wireless Broadband Textbook," IDG Japan, Jun. 10, 2002, p. 142-p. 143. (no English text).

Schulzrinne et al., Emergency Services for Internet Telephony Systems draft-schulzrinne-sipping-emergency-arch, IETF Standard Working Draft, Feb. 4, 2004, 1-22.

* cited by examiner

UNIQUE GLOBAL IDENTIFIER HEADER FOR MINIMIZING PRANK EMERGENCY 911 CALLS

The present application is a continuation of U.S. application Ser. No. 14/448,320, entitled "Unique Global Identifier Header for Minimizing Prank 911 Calls", to Goswami et al., filed on Jul. 31, 2014; which is a continuation of U.S. application Ser. No. 13/632,313,entitled "Unique Global Identifier Header for Minimizing Prank Emergency 911 Calls", to Goswami et at., filed on Oct. 1, 2012, now U.S. Pat. No. 8,831,556; which claims priority from U.S. Provisional No. 61/541,615, entitled "Unique Global Identifier Header for Minimizing Prank Emergency 911 Calls", to Goswami et al., filed Sep. 30, 2011; the entirety of which are explicitly incorporated herein by reference.

BACKGROUND OF THE INVENTION

1. Field of the Invention

This invention relates generally to telecommunications. More particularly, it relates to distributed Emergency Call Systems.

2. Background of Related Art

A 911 emergency call system bridges local government entities and call service providers, to route 911 voice calls to proper emergency dispatch personnel.

In particular, the 911 emergency call system routes a 911 voice call to a Public Safety Answering Point (PSAP) (i.e. a 911 dispatcher/emergency call center) to administer proper emergency services. The 911 emergency call system preferably routes a 911 voice call to a Public Safety Answering Point (PSAP) within closest geographic proximity to an originating communication device.

Figure 5:
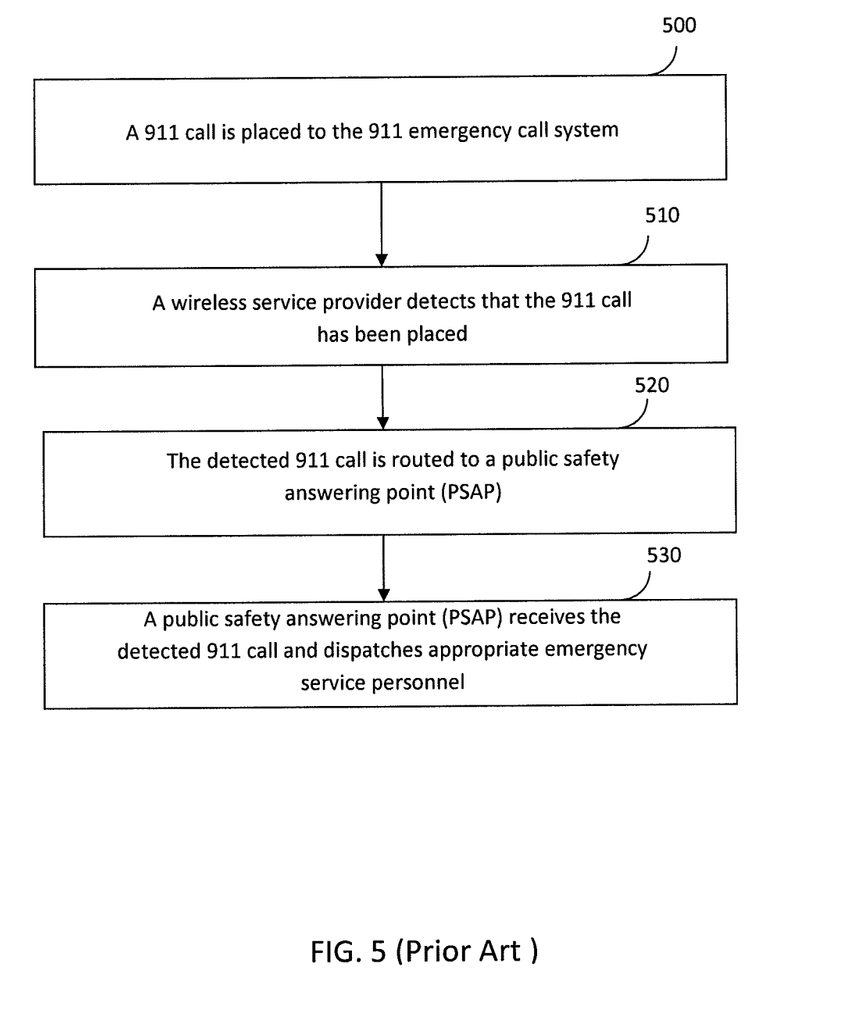
FIG. 5 demonstrates a conventional 911 call system call flow.

FIG. 5 demonstrates a conventional 911 call system call flow.

In particular, a 911 voice call is placed via an originating communication device (e.g. a landline communication device, a wireless communication device, etc.), as depicted in step 500. In step 510, a call service provider servicing the originating communication device detects that a 911 voice call has been placed. If the originating communication device is not able to be serviced by an affiliated call service provider (e.g. the communication device is outside the service jurisdiction of an affiliated call service provider, the communication device is not subscribed to any service(s) provided by a call service provider, etc.), 911 call processing is defaulted to a call service provider servicing a geographic location established for the originating communication device. In step 520, an applicable call service provider routes the detected 911 voice call to an appropriate Public Safety Answering Point (PSAP) via conventional call routing procedures. In step 530, the detected 911 voice call is received on an appropriate Public Safety Answering Point (PSAP), and emergency service personnel are thereby dispatched accordingly.

Enhanced 911 (E911) is a reformed version of the 911 emergency call system, employed in response to advancements achieved in current communication technologies. In particular, Enhanced 911 (E911) provides accurate 911 call routing services to a wide array of previously unsupported communication devices (e.g. wireless devices, VoIP devices, etc.) In operation, Enhanced 911 retrieves E911 voice information and relevant emergency call data (e.g. a subscriber number and a geographic location) pertaining to each E911 voice call that is detected. Relevant call data is subsequently routed to an appropriate Public Safety Answering Point (PSAP).

Wireless Enhanced 911 is a particular denomination of Enhanced 911, responsible for routing 911 voice calls originated on a wireless communication device. Wireless Enhanced 911 identifies a Mobile Subscriber Identification Number (MSIN) and a current geographic location for each device that is party to a Wireless E911 voice call. Accordingly, an associated MSIN/geographic location combination is routed to an appropriate Public Safety Answering Point (PSAP) with each Wireless E911 call that is detected.

A Mobile Subscriber Identification Number (MSIN) identifying an originating 911 calling device is retrieved for Wireless E911 call processing via an Automatic Number Identification (ANI) Service.

In particular, a unique Mobile Subscriber Identification Number (MSIN) is assigned to each communication device that is subscribed to service(s) administered by a wireless/call service provider. Furthermore, each instantiation of a Mobile Subscriber Identification Number (MSIN) to a particular communication device is recorded in a database maintained by the Automatic Number Identification (ANI) service.

Figure 6:
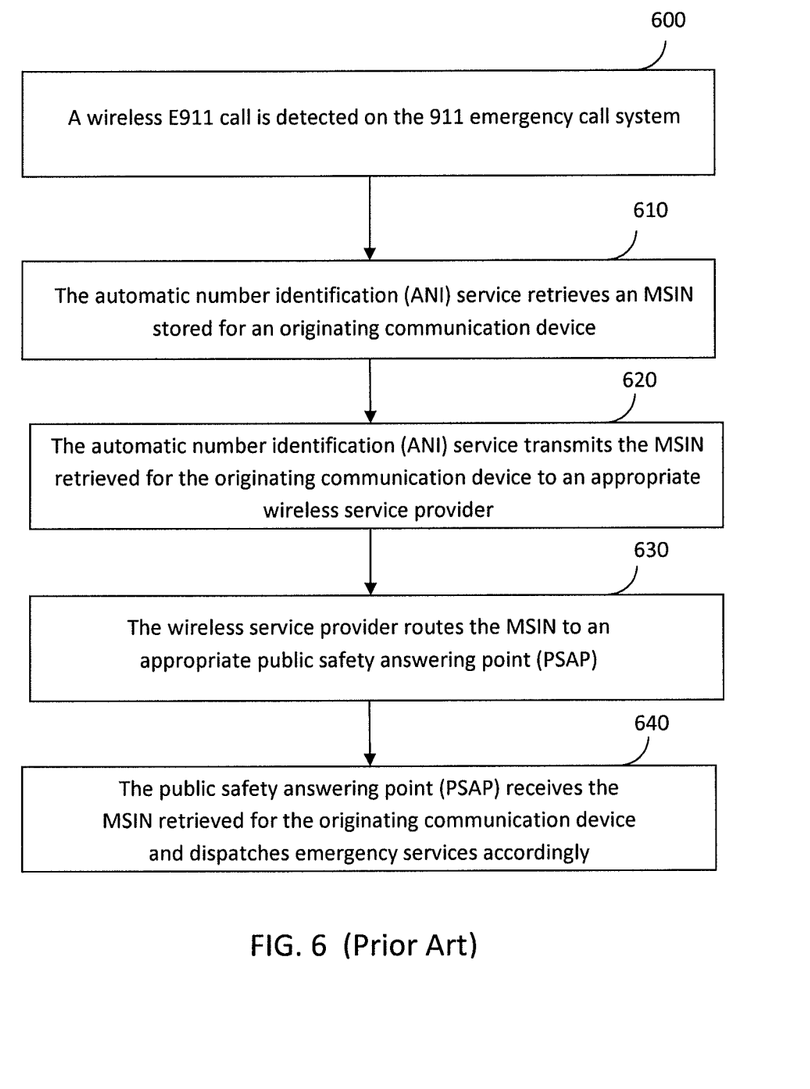
FIG. 6 conveys a conventional use of the Automatic Number Identification (ANI) service within a Wireless E911 call system.

FIG. 6 conveys a conventional use of an Automatic Number Identification (ANI) service within a Wireless E911 call system call flow.

In particular, a Wireless E911 call is detected upon the 911 emergency call system, as depicted in step 600. Upon detection, the Automatic Number Identification (ANI) service retrieves a Mobile Subscriber Identification Number (MSIN) stored for an originating communication device, as depicted in step 610. Once retrieved, the Automatic Number Identification (ANI) service transmits the Mobile Subscriber Identification Number (MSIN) to a wireless service provider administering E911 call routing, as shown in step 620. The Mobile Subscriber Identification Number (MSIN) is subsequently received on an appropriate wireless service provider and forwarded to a Public Safety Answering Point (PSAP), as conveyed in step 630. The Mobile Subscriber Identification Number (MSIN) is thereafter received on a Public Safety Answering Point (PSAP) and emergency service personnel are thereby dispatched accordingly, as depicted in step 640.

A geographic location may be determined for an originating communication device via an active location service (e.g. GPS) residing on the calling handset. Moreover, a geographic location for an originating communication device may alternatively be determined based upon the location of a base station servicing a corresponding E911 call. A location for an originating communication device is conventionally used to route an E911 call to an appropriate Public Safety Answering Point (i.e. a Public Safety Answering Point (PSAP) within closest geographic proximity to an originating communication device). Furthermore, a geographic location for an originating communication device promotes efficient dispersal of emergency services when routed to a Public Safety Answering Point (PSAP) administering E911 call dispatching.

According to a Federal Communications Commission (FCC) mandate, all wireless devices must be permitted access to 911 emergency call services, regardless of current service subscription. Thus, the 911 emergency call system must be capable of detecting and routing 911 voice calls placed via wireless devices that are disconnected from service.

A geographic location for a disconnected wireless device may be determined for E911 call processing via conventional handset-based/network-based device location techniques. Yet, a source of an E911 voice call originated on a disconnected wireless device is not easily identifiable. In particular, a wireless device that is disconnected from service is not attributed a Mobile Subscriber Identification Number (MSIN) corresponding to a particular subscriber account.

Therefore, identification of a 911 calling party may not be automatically obtained via the Automatic Number Identification (ANI) service. Moreover, it is not possible to accurately ascertain the ownership of a disconnected wireless device. Hence, 911 calls that are placed via a disconnected wireless device are fundamentally anonymous.

To reduce anonymity, wireless service providers often designate arbitrary number identifiers (e.g. MSIN, IMSI, etc.) to wireless devices that are not subscribed to service. An arbitrary number identifier is routed to a Public Safety Answering Point (PSAP) for each E911 voice call that is originated on a corresponding wireless device.

Unfortunately, the 911 emergency call system is currently afflicted with prank 911 calls originating on wireless devices that are disconnected from service.

Presently, the only information that is obtainable for an E911 voice call placed via a disconnected wireless device, is a geographic location and an arbitrary number identifier. Although a means of filtering prank 911 calls would be useful, prank 911 calls placed via disconnected wireless devices may not be filtered based solely upon an arbitrary number identifier (e.g. MSIN, IMSI, etc.) assigned to an originating communication device. First, a number identifier assigned to a disconnected wireless device is not guaranteed to be unique. Furthermore, a disconnected wireless device may change hands at any given time, e.g., a device may be sold, borrowed, traded, etc. Therefore, it is possible, e.g., that a non-prank caller may purchase a disconnected wireless device with a number identifier depicting a device used to generate prank 911 calls. In this case, if a prank 911 call placed via a disconnected wireless device is filtered according to a device's arbitrary number identifier, it is likely that a non-prank caller may be denied access to E911 emergency call services.

Due to a lack of source information, it is difficult to prevent the routing of prank 911 calls originating on wireless devices that are disconnected from service. Hence, there is a need for a solution that may accurately identify prank 911 calling devices, regardless of current service subscription, and filter the routing of 911 calls that are placed thereon.

SUMMARY OF THE INVENTION

In accordance with the principles of the present invention, a method and apparatus to provide 911 prank call filtering over a 911 emergency call system comprises transmitting, to a physical prank call server, a prank call signal associated with a unique global identifier assigned to a given 911 call, if the given 911 call is detected at a PSAP to be a prank 911 calling device. A prank call database is queried for correlation between a calling device of said given 911 call with a pre-identified prank calling device. If information maintained within the prank call database correlates a detected 911 call with an identified prank calling device, then the detected prank 911 call is dropped.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a prank call server that administers 911 prank call filtering over a 911 emergency call system. In particular, the inventive prank call server identifies prank calling devices (i.e. devices generating prank 911 calls) by retrieving and analyzing emergency call data (i.e. a subscriber number, an arbitrary number identifier, a geographic location, etc.) pertaining to prank 911 calls detected on the 911 emergency call system.

In accordance with the principles of the present invention, the inventive prank call server is implemented during 911 emergency call routing to prevent 911 calls originated on identified prank calling devices from being routed to a public safety answering point (PSAP).

In accordance with the principles of the present invention, the inventive prank call server assigns a unique global identifier to each 911 call that is detected on the 911 emergency call system. Global identifiers attributed to detected 911 voice calls permit a public safety answering point (PSAP) to uniquely reference each prank 911 call that is identified thereon. A public safety answering point (PSAP) transmits a prank call signal and a relevant unique global identifier to the prank call server, for each prank 911 call that is detected. A prank call signal/unique global identifier combination, triggers the inventive prank call server to retrieve emergency call data pertaining to a corresponding prank 911 call. Prank call data is logged in an inventive prank call database.

The inventive prank call database is queried for each 911 call that is detected on the 911 emergency call system, in accordance with the principles of the present invention. If information maintained within the prank call database correlates a detected 911 voice call with an identified prank calling device, then the detected 911 voice call is dropped, and corresponding call data is logged in the prank call database for subsequent call filtering analysis.

Figure 1:
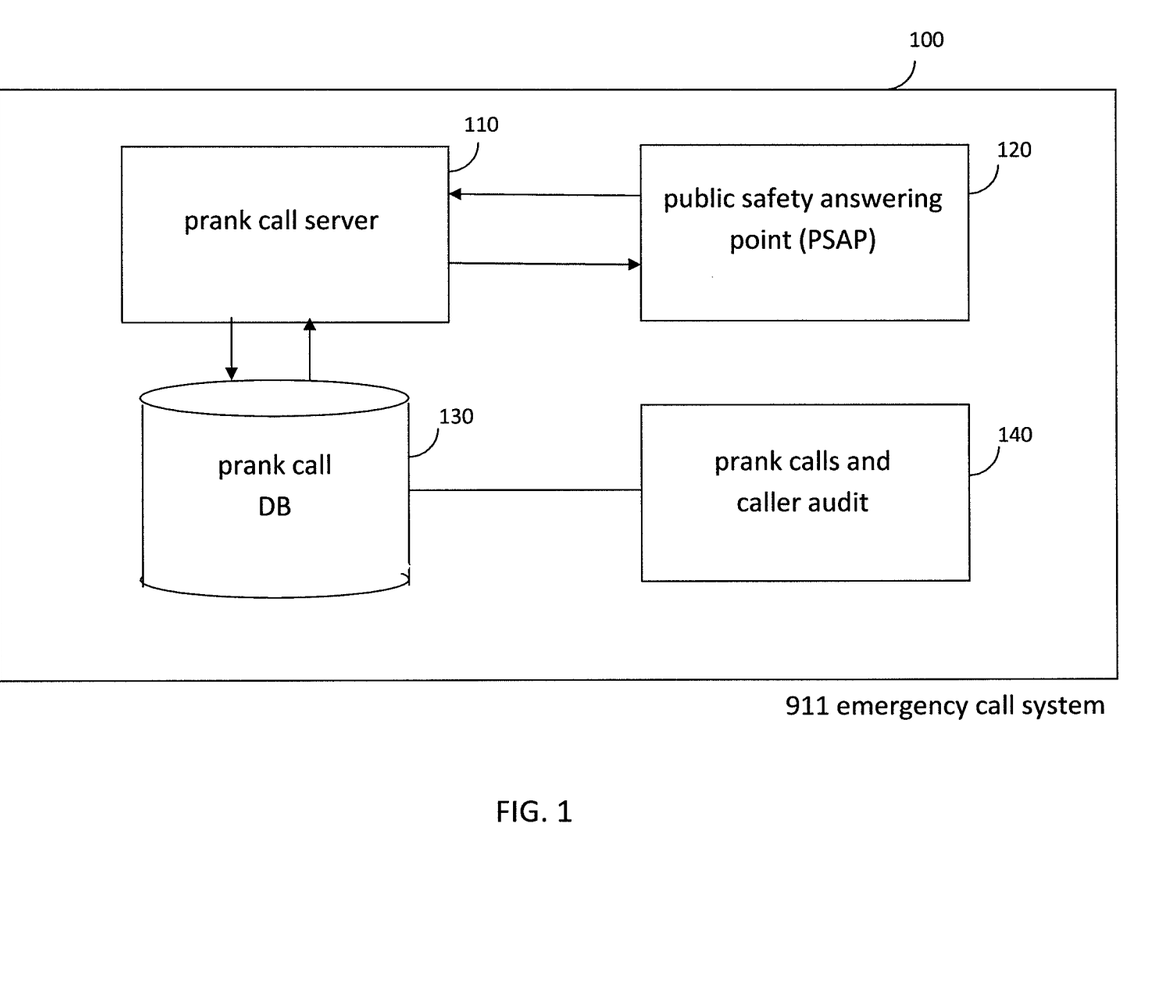
FIG. 1 depicts an exemplary network structure for a prank call server implemented over the 911 emergency call system, in accordance with the principles of the present invention.

FIG. 1 depicts an exemplary network structure for a prank call server implemented over the 911 emergency call system, in accordance with the principles of the present invention.

In particular, a prank call server 110 is integrated within the 911 emergency call system 100 to mitigate the volume of prank 911 calls routed to a public safety answering point (PSAP) 120. A public safety answering point (PSAP) 120 transmits a prank call signal and a relevant unique global identifier to the prank call server 110, each instance a prank 911 call is detected.

The inventive prank call server 110 utilizes a prank call database 130 to store data pertaining to prank 911 calls detected on the 911 emergency call system 100. The prank call server 110 additionally queries the prank call database 130 to determine if emergency call data retrieved for a detected 911 voice call, corresponds to information stored for an identified prank calling device. The prank call server 110 utilizes information compiled within the prank call database 130 to perform 911 prank call filtering, prior to routing a 911 voice call to a public safety answering point (PSAP) 120.

In a preferred embodiment, a prank calls and caller audit system 140 is implemented to provide a user interface to the prank call database 130. In particular, a prank calls and caller audit system 140 preferably permits an authoritative entity (e.g. a law enforcement officer, an emergency call dispatcher, etc.) to view and/or modify (e.g. add and/or delete) prank call data maintained within the prank call database 130.

Figure 2:
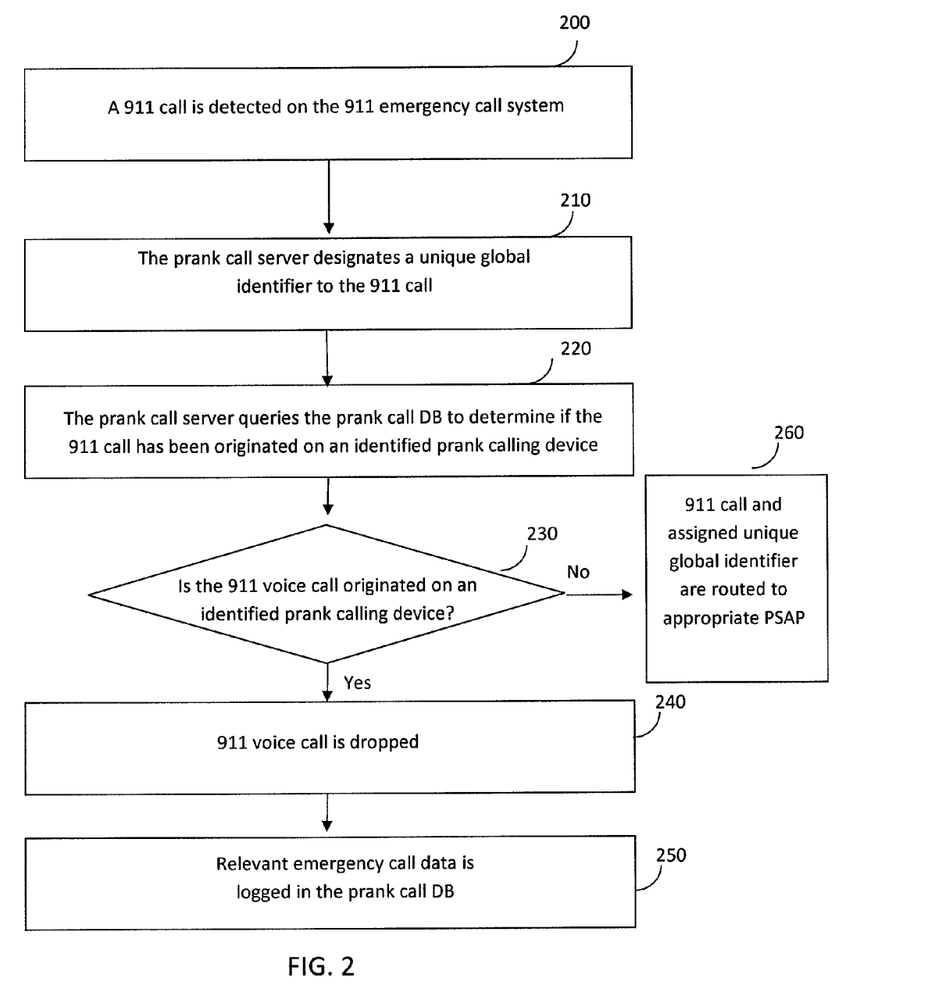
FIG. 2 demonstrates an exemplary call filtering process performed by a prank call server implemented within the 911 emergency call system, in accordance with the principles of the present invention.

FIG. 2 demonstrates an exemplary call filtering process performed by a prank call server implemented within the 911 emergency call system, in accordance with the principles of the present invention.

In particular, a 911 voice call is detected on the 911 emergency call system, as depicted in step 200. Upon detection, the inventive prank call server designates a unique global identifier to the 911 call, as shown in step 210. In step 220, the prank call server queries the prank call database, using conventional emergency call data (i.e. a subscriber number, an arbitrary number identifier, a geographic location, etc.) retrieved for the detected 911 voice call. The prank call database is queried to determine if call data pertaining to the 911 voice call correlates with data stored for an identified prank calling device.

If the query to the prank call database (performed in step 220) indicates that the 911 voice call is originated on an identified prank calling device (step 230), the 911 call is dropped, as depicted in step 240. Relevant emergency call data is subsequently logged in the inventive prank call database, as shown in step 250.

Alternatively, if the query to the prank call database (performed in step 220) does not indicate that the 911 call is originated on an identified prank calling device (step 230), the 911 call and an assigned unique global identifier are routed to an appropriate public safety answering point (PSAP), as shown in step 260.

Figure 3:
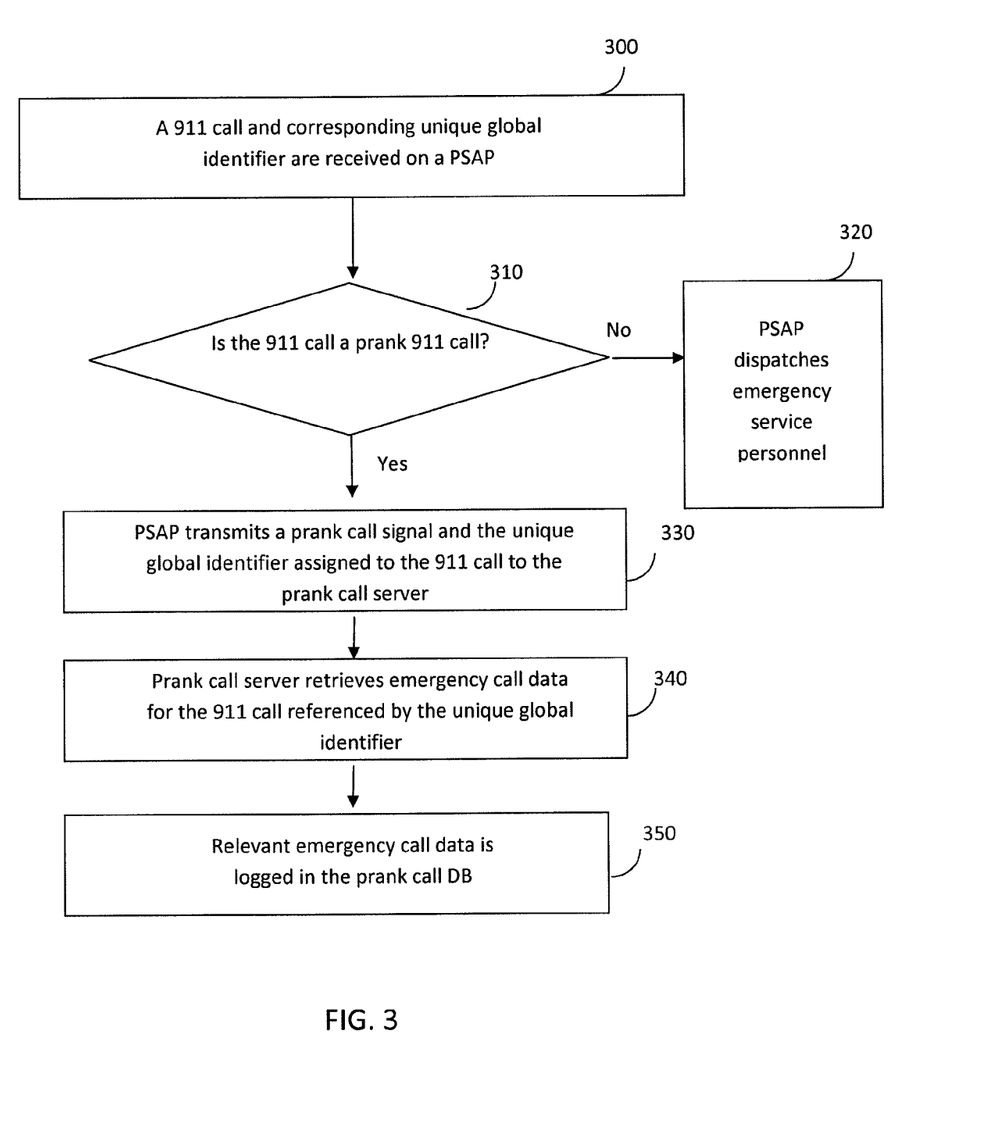
FIG. 3 portrays exemplary data accumulation performed by the prank call server for a prank 911 call detected on the 911 emergency call system, in accordance with the principles of the present invention.

FIG. 3 portrays exemplary data accumulation performed by the prank call server for a prank 911 call detected on the 911 emergency call system, in accordance with the principles of the present invention.

In particular, a 911 voice call and a unique global identifier are received on a public safety answering point (PSAP), as depicted in step 300. If the 911 call (received in step 300) is not a prank 911 call (step 310), the public safety answering point (PSAP) performs conventional 911 call dispatching services, as depicted in step 320.

Alternatively, if the 911 call (received in step 300) is a prank 911 call (step 310), the public safety answering point (PSAP) transmits a predetermined prank call signal and a corresponding unique global identifier to the prank call server, as depicted in step 330. Upon receipt, the prank call server retrieves all information available to the 911 emergency call system for the 911 call referenced by the received unique global identifier, as depicted in step 340. The prank call server subsequently logs all data retrieved for the prank 911 call in to the prank call database, as depicted in step 350.

In accordance with the principles of the present invention, the prank call server may identify prank calling devices for the performance of 911 prank call filtering, regardless of a particular device's current service subscription. In particular, 911 calls generated on prank calling devices that are affiliated with a particular subscriber account, may be filtered via a corresponding subscriber identification number, e.g., MSIN, IMSI, etc. Alternatively, calls generated on prank calling devices that are not subscribed to service, may be identified via prank call trends and prank call history, established/accumulated within the inventive prank call database.

Communication devices that are subscribed to service(s) provided by a wireless/call service provider are assigned a unique mobile subscriber identification number (MSIN), corresponding to a particular subscriber account. In a particular embodiment, once a communication device affiliated with a wireless/call service provider has exceeded a maximum number of permissible prank 911 calls, that particular communication device is classified as an identified prank calling device. Consequently, when the 911 emergency call system detects that a mobile subscriber identification number (MSIN) retrieved for an originating communication device, matches a mobile subscriber identification number (MSIN) stored for an identified prank calling device, the 911 call is dropped, thereby blocking the prank calling device from accessing 911 emergency call services.

Figure 4:
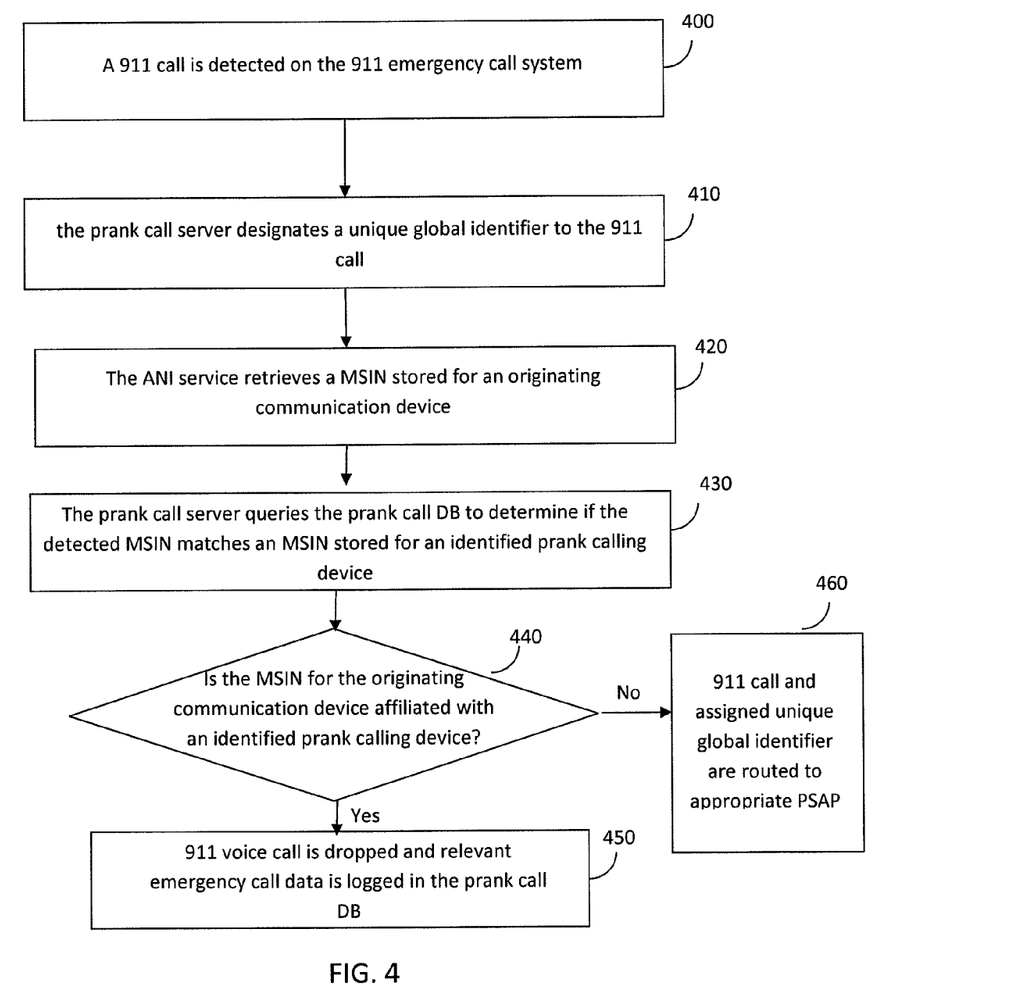
FIG. 4 depicts an exemplary call filtering process for a 911 call placed by a communication device that is subscribed to wireless service(s), in accordance with the principles of the present invention.

FIG. 4 depicts an exemplary call filtering process for a 911 call placed by a communication device that is subscribed to wireless service(s), in accordance with the principles of the present invention.

In particular, a 911 call is detected on the 911 emergency call system, as depicted in step 400. Upon detection, the prank call server assigns the 911 call a unique global identifier, as shown in step 410. In step 420, the automatic number identification (ANI) service retrieves a mobile subscriber identification number (MSIN) affiliated with an originating communication device. In step 430, the prank call server queries the prank call database to determine if the mobile subscriber identification number (MSIN) identified for the originating communication device, matches a mobile subscriber identification number (MSIN) stored for an identified prank calling device. If the query to the prank call database indicates a match (step 440), the detected 911 voice call is dropped and corresponding emergency call data is logged in the prank call database, as depicted in step 450. Alternatively, if the query to the prank call database does not indicate a match (step 440), the relevant 911 call and a corresponding unique global identifier are routed to an appropriate public safety answering point (PSAP), as depicted in step 460.

Alternatively, wireless devices that are disconnected from service are not assigned a mobile subscriber identification number (MSIN) corresponding to a particular subscriber account. Yet, wireless service providers often designate arbitrary number identifiers (e.g. MSIN, IMSI, etc.) to disconnected wireless devices, to aid 911 emergency call processing.

In accordance with the principles of the present invention, an originating geographic location (e.g. exact geographic coordinates, cell-tower information, PIDF-LO, etc.) and an arbitrary number identifier (e.g. MSIN, IMSI, etc.) are stored in the prank call database, for prank 911 calls placed by wireless devices without subscription to wireless/call service(s). Prank call trends may then be identified based upon geographic location/arbitrary number identifier combinations maintained within the prank call database. For instance, if an arbitrary number identifier and a geographic location retrieved for a 911 call detected on the 911 emergency call system, are both stored in combination in the prank call database, then the prank call server recognizes that the 911 call has been originated on an identified prank calling device, and the 911 call is dropped. Relevant emergency call data is then stored in the prank call database for future call filtering analysis.

Furthermore, if multiple prank 911 calls originating from various geographic locations, are affiliated with the same arbitrary number identifier (i.e. the calling device is moving), then all calls affiliated with that particular arbitrary number identifier may be blocked for a given period of time.

Being that wireless devices that are disconnected from service may change hands at any given time (e.g. a device may be sold, borrowed, traded, etc.), a geographic location/arbitrary number identifier combination stored in the prank call database for a particular disconnected wireless device, should expire after a given period of time. Requiring prank call data stored for disconnected wireless devices to expire, may potentially prevent non-prank callers from being denied access to 911 emergency call services.

In an alternate embodiment, rather than dropping a 911 call originated on an identified prank calling device, the emergency call routing system may alternatively route the particular 911 call to a public safety answering point (PSAP), accompanied by an appropriate indicator (i.e. warning). A public safety answering point (PSAP) may then decide on an appropriate punitive action, depending, e.g., on present call volume, 911 call policy, etc.

While the invention has been described with reference to the exemplary embodiments thereof, those skilled in the art will be able to make various modifications to the described embodiments of the invention without departing from the true spirit and scope of the invention.

What is claimed is:

1. A method of detecting a prank emergency call, comprising:
    logging, to a physical prank call database, a unique global identifier assigned to a first prank emergency call from a given wireless device;
    logging, to said physical prank call database, a first current location of said given wireless device initiating said first prank emergency call;
    subsequently receiving a subsequent emergency call;
    obtaining a subsequent current location of a subsequent wireless device while making said subsequent emergency call;
    querying said physical prank call database for a correlation between said subsequent current location of said subsequent emergency call, and said first current location of said first prank emergency call; and
    dropping said subsequent emergency call when said correlation is established between said first current location of said first prank emergency call and said subsequent current location of said subsequent emergency call.

2. The method of detecting a prank emergency call according to claim 1, wherein:
    said correlation corresponds to a match between said first current location and said subsequent current location.

3. The method of detecting a prank emergency call according to claim 2, wherein:
    said unique global identifier is a mobile subscriber identification number; and
    said correlation corresponds to a match between a mobile subscriber identification number associated with said first prank emergency call, and a mobile subscriber identification number associated with said subsequent emergency call.

4. The method of detecting a prank emergency call according to claim 1, wherein:
    said unique global identifier is a mobile subscriber identification number; and
    said correlation corresponds to a match between a mobile subscriber identification number associated with said first prank emergency call, and a mobile subscriber identification number associated with said subsequent emergency call.

5. The method of detecting a prank emergency call according to claim 1, further comprising:
    assigning a unique global identifier to said subsequent emergency call.

6. The method of detecting a prank emergency call according to claim 1, wherein:
    said physical prank call database assigns said unique global identifier.

7. The method of detecting a prank emergency call according to claim 1, further comprising:
    expiring said logging of said first prank emergency call after a predetermined period of time.

8. The method of detecting a prank emergency call according to claim 1, wherein:
    said given wireless device is identified in said physical prank call database with a unique global identifier.

9. The method of detecting a prank emergency call according to claim 8, further comprising:
    assigning said unique global identifier to said given wireless device at a physical 911 call server.

10. The method of detecting a prank emergency call according to claim 1, wherein:
    said given wireless device is identified in said physical prank call database with an automatic number identification (ANI) service.

11. The method of detecting a prank emergency call according to claim 1, wherein:
    said given wireless device is identified in said physical prank call database with an mobile subscriber identification number (MSIN).

12. The method of detecting a prank emergency call according to claim 1, further comprising:
    storing emergency call data pertaining to said first prank emergency call in said physical prank call database.

13. The method of detecting a prank emergency call according to claim 1, further comprising:
    said first prank emergency call is a voice call.

14. The method of detecting a prank emergency call according to claim 1, wherein:
    said given wireless device is not subscribed to a wireless carrier.

15. Apparatus to detect a prank emergency call, comprising:
    means for logging, to a physical prank call database, a unique global identifier assigned to a first prank emergency call from a given wireless device;
    means for logging, to said physical prank call database, a first current location of said given wireless device initiating said first prank emergency call;
    means for subsequently receiving a subsequent emergency call;
    means for obtaining a subsequent current location of a subsequent wireless device while making said subsequent emergency call;
    means for querying said physical prank call database for a correlation between said subsequent current location of said subsequent emergency call, and said first current location of said first prank emergency call; and
    means for dropping said subsequent emergency call when said correlation is established between said first current location of said first prank emergency call and said subsequent current location of said subsequent emergency call.

16. The apparatus to detect a prank emergency call according to claim 15, wherein:
    said correlation corresponds to a match between said first current location and said subsequent current location.

17. The method of detecting a prank emergency call according to claim 15, wherein:

said unique global identifier is a mobile subscriber identification number; and said correlation corresponds to a match between a mobile subscriber identification number associated with said first prank emergency call, and a mobile subscriber identification number associated with said subsequent emergency call.

18. The method of detecting a prank emergency call according to claim 15, further comprising:

means for expiring said logging of said first prank emergency call after a predetermined period of time.

19. The method of detecting a prank emergency call according to claim 15, wherein:

said given wireless device is identified in said physical prank call database with an automatic number identification (ANI) service.

20. The method of detecting a prank emergency call according to claim 15, wherein:

said given wireless device is not subscribed to a wireless carrier.

\* \* \* \* \*